Dec. 19, 1961    W. V. ZEMAN    3,013,530
ANIMAL RESTRAINING DEVICE
Filed April 26, 1960
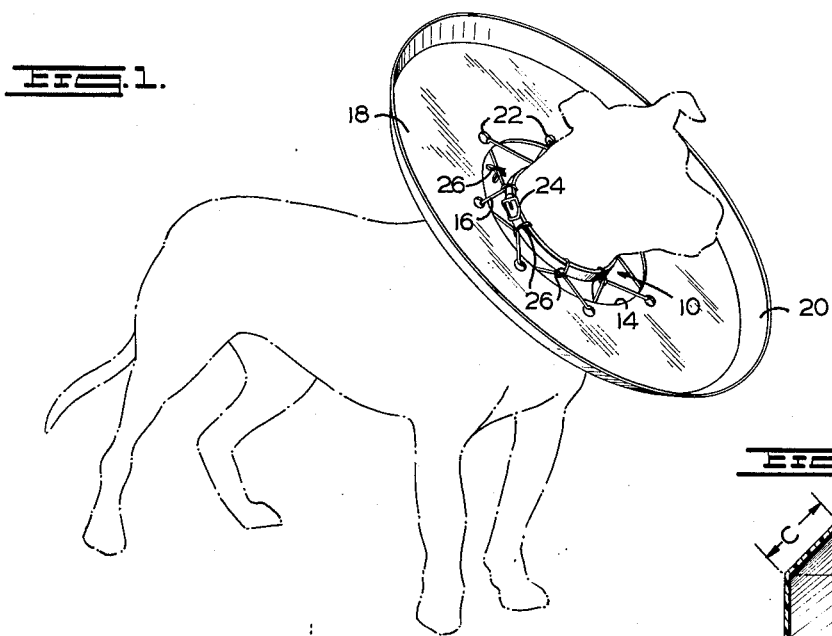
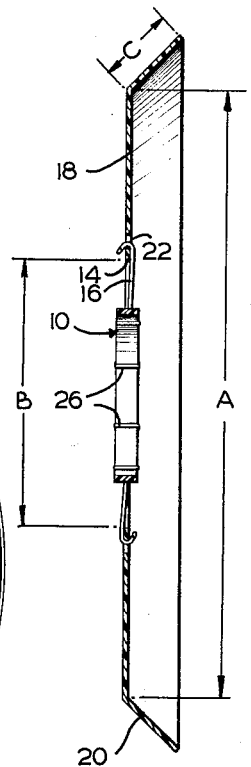
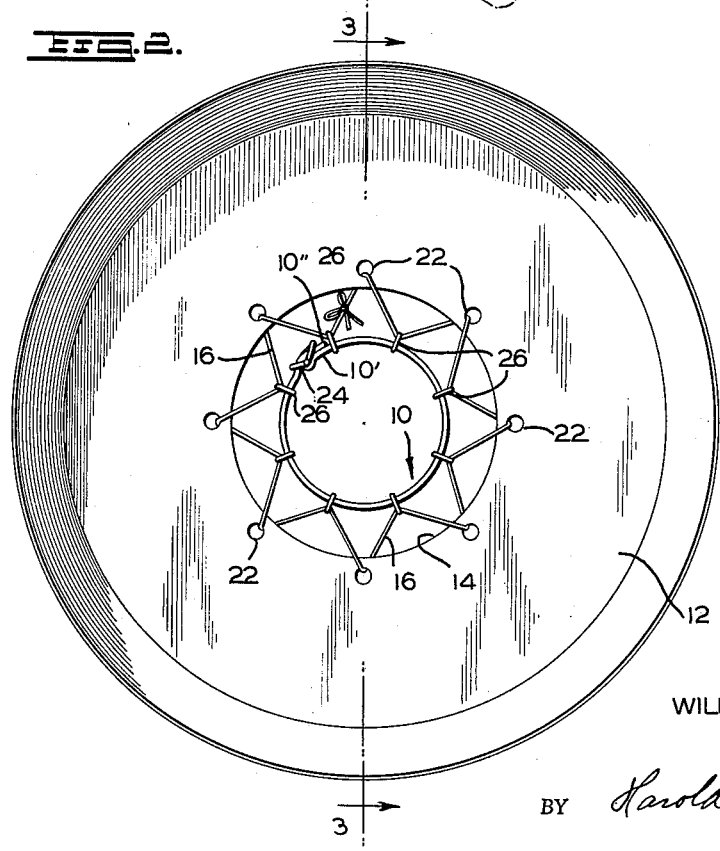
INVENTOR
WILLIAM V. ZEMAN
BY Harold T. Stowell
ATTORNEY

United States Patent Office 3,013,530
Patented Dec. 19, 1961

3,013,530
ANIMAL RESTRAINING DEVICE
William V. Zeman, Sparta, N.J., assignor to Schering Corporation, Bloomfield, N.J., a corporation of New Jersey
Filed Apr. 26, 1960, Ser. No. 24,750
6 Claims. (Cl. 119—106)

This invention relates to an animal restraining device and, more particularly, to a restraining device having particular utility in veterinary practice.

An object of the invention is to provide a device adapted to be placed about the neck of an animal to restrict the turning of its head more than a predetermined amount thereby preventing the animal from irritating skin lesions by licking them and preventing the animal from damaging a healing wound by biting or pulling the sutures thereof.

It is a further object to provide such a device that will protect the head of an animal thus preventing self-inflicted injury, particularly to operative wounds about the head of the wearer.

A further object is to provide a neck-encircling restraining device including an upturned peripheral outer edge to effectively reduce self-inflicted injury by the animal's tongue.

Another object is to provide such a device which is simple in design, relatively inexpensive to manufacture, effective in operation and readily adjustable in size and snugness of fit.

These and other objects and advantages are provided by the restraining device of the present invention adapted to be worn about the neck of an animal and which generally comprises a collar band, a generally circular plate member having a central opening therein larger than the diameter of the collar band, and flexible draft means engaging at spaced points the collar and the peripheral edge of the opening in the plate member and mounting the collar band substantially centrally of the opening in the plate member.

Further objects and advantages of the invention will become apparent from the following description of a preferred embodiment thereof as illustrated in the accompanying drawings wherein:

FIG. 1 is a perspective view of the animal restraining device of the invention shown positioned about the neck of an animal;

FIG. 2 is a front plan view of the device illustrated in FIG. 1; and

FIG. 3 is a sectional view substantially on line 3—3 of FIG. 2.

Referring to the drawings, the improved animal restraining device generally comprises a collar band 10, a plate or disc member 12 having a centrally positioned opening 14 therein and flexible draft means 16 joining at spaced points the collar band 10 and the peripheral edge of the plate member 12.

The plate member 12, as illustrated in the drawings, may comprise a generally annular disc-shaped member 18 provided with an angular edge portion 20. About the central opening 14 in the disc 18 are provided a plurality of small openings 22. The disc or plate member 12 may be constructed of a plurality of materials such as plastic, metal, paperboard, plastic coated paper, and the like. However, to be effective, the plate member 12 should have sufficient rigidity to resist resilient bending to an extent which would render the device inoperative for its intended purpose and have sufficient strength to prevent permanent bending by movements of the wearer thereof.

The collar 10 is preferably of the adjustable type and is provided with a conventional separable fastener or buckle generally designated 24 of any well known type whereby the two ends 10' and 10'' of the collar band 10 may be separated to assist in the attachment of the protective device about the neck of an animal.

The collar band 10 may be constructed of leather, plastic or the like; however, preferably a plastic collar band is employed which will resist soiling and provide an easily washable and disinfected assembly.

The collar band 10 carries a plurality of spaced rings 26 which freely encircle the collar band and provide loops for the reception of the flexible draft means 16 which mount the collar band 12 generally centrally of the opening 14 in the plate member 12. The flexible draft means in the illustrated form of the invention comprises a lacing, the free ends of which are suitably joined by tying as at 26 after the lacing 16 is alternately passed through the loops formed by the ring members 16 and the openings 22 about the peripheral edge of the opening 14 in the disc member 12.

The lacing or flexible draft member between the collar band 10 and the peripheral edge of the opening 14 permits flexing of the relatively rigid plate member 12 relative to the collar band 10 and also permits the use of the device on animals having a range of neck sizes as the lacing member 16 permits adjusting of the collar band 10 relative to the peripheral edge of the opening 14.

In positioning the device of the invention on an animal, the angular edge portion 20 of the restraining device projects generally toward the head of the animal and aids in preventing the tongue of the restrained animal from reaching over the periphery of the collar and into contact with a wound to be protected.

While the device of the invention is adjustable in size, for the most effective protection and comfort to the animal, it is preferable to provide the protective device in a plurality of sizes.

For dogs, it has been found that four sizes are generally sufficient and, in general, the length or diameter A of the plate member 18 is about 2 to 3 times the diameter B of the central opening therein, and the central opening is about 2 to about 3 times the length of the angular edge 20. The following four sizes have been found to be very suitable for dog-sized animals:

(1) Diameter A _____ About 12½ inches.
    Diameter B _____ About 5½ inches.
    Length C of angular edge____ About 1½ inches.
    Angle of edge to the
      plane of the disc_____ About 45°.

(2) Diameter A _____ About 17 inches.
    Diameter B _____ About 7 inches.
    Length C of angular edge____ About 2 inches.
    Angle of edge to the
      plane of the disc_____ About 45°.

(3) Diameter A _____ About 22 inches.
    Diameter B _____ About 8½ inches.
    Length C of angular edge____ About 3 inches.
    Angle of edge to the
      plane of the disc_____ About 45°.

(4) Diameter A _____ About 30 inches.
    Diameter B _____ About 10 inches.
    Length C of angular edge____ About 4 inches.
    Angle of edge to the
      plane of the disc_____ About 45°.

From the foregoing description and the drawings, it will be apparent to those skilled in the art that an improved animal restraining device is provided, fully accomplishing all of the aims and objects hereinbefore set forth. It will be further appreciated by those skilled in the art that various modifications may be made in the device without departing from the scope of the appended claims. For example, while a lacing 26 has been illustrated as the means connecting the collar band 10 to the openings 22 in the disc member 12, elastic bands constructed of resilient materials such as natural or synthetic rubber or helically wound springs may be employed.

I claim:

1. A restraining device adapted to be worn about the neck of an animal comprising a collar band, a generally circular plate member having a central opening therein larger than the diameter of the collar band and flexible draft means engaging at spaced points the collar and the peripheral edge of the opening in the plate member and mounting the collar band substantially centrally of the opening in the plate member.

2. A restraining device adapted to be worn about the neck of an animal comprising an adjustable collar band, a generally circular plate member having a central opening therein larger than the diameter of the collar band, and flexible draft means engaging at spaced points the collar band and the peripheral edge of the opening in the plate member and mounting the collar band substantially centrally of the opening in the plate member.

3. A restraining device adapted to be worn about the neck of an animal comprising an adjustable collar band, separable fastener means for adjusting the diameter of the collar band, a generally circular plate member having a central opening therein larger than the diameter of the collar band and flexible draft means engaging at spaced points the collar band and the peripheral edge of the opening in the plate member and mounting the collar band substantially centrally of the opening in the plate member.

4. The invention defined in claim 3 including an inturned peripheral edge about said circular plate member.

5. The invention defined in claim 3 wherein the diameter of the circular plate member is about 2 to about 3 times the diameter of the central opening in said plate member.

6. The invention defined in claim 4 wherein the diameter of the plate member is from about 2 to about 3 times the diameter of the central opening therein and wherein the central opening in the plate member is from about 2 to about 3 times the length of the inturned edge of said plate member.

References Cited in the file of this patent

UNITED STATES PATENTS

| | | |
|---|---|---|
| 2,496,748 | Pond | Feb. 7, 1950 |
| 2,799,245 | Ruggiero et al. | July 16, 1957 |
| 2,891,508 | Bower | June 23, 1959 |
| 2,956,542 | Mueller | Oct. 18, 1960 |

OTHER REFERENCES

Chinchilla Sales Catalogue, Dec. 9, 1957, page 29.